(12) United States Patent
D'Arcy et al.

(10) Patent No.: US 6,687,359 B1
(45) Date of Patent: Feb. 3, 2004

(54) METHOD FOR CONTROLLING A TELEPHONE CALL BETWEEN TWO ITEMS OF TERMINATING EQUIPMENT

(75) Inventors: Paul D'Arcy, Galway (IE); Michael Brosnan, Galway (IE); Trevor Fahey, Loughrea (IE)

(73) Assignee: Nortel Networks Limited, St. Laurent (CA)

( * ) Notice: Subject to any disclaimer, the term of this patent is extended or adjusted under 35 U.S.C. 154(b) by 497 days.

(21) Appl. No.: 09/708,382

(22) Filed: Nov. 8, 2000

(51) Int. Cl.[7] ................................................ H04M 3/42
(52) U.S. Cl. ............................ 379/209.01; 379/210.01; 379/88.13
(58) Field of Search ......................... 379/88.03, 88.13, 379/209.01, 207.15, 207.06, 207.07, 210.01

(56) References Cited

U.S. PATENT DOCUMENTS

| | | | |
|---|---|---|---|
| 5,668,853 A | * 9/1997 | Florence et al. ............. | 379/67.1 |
| 6,430,283 B1 | * 8/2002 | Wille .......................... | 379/225 |
| 6,473,612 B1 | * 10/2002 | Cox et al. .................... | 455/414 |
| 6,490,349 B1 | * 12/2002 | Garfinkel et al. ......... | 379/265.02 |

* cited by examiner

*Primary Examiner*—Ahmad F. Matar
*Assistant Examiner*—Rasha S Al-Aubaidi
(74) *Attorney, Agent, or Firm*—Barnes & Thornburg

(57) ABSTRACT

The invention allows a calling party who fails to get through to a called number and is diverted to a mailbox to set-up automatic re-dialling of the number. This entails the calling party's phone ringing the called number periodically for a pre-determined period of time, as defined by a user or within a PBX. The call is allowed to ring for a time less than the time at which the call would normally be diverted to the mailbox for the called number. Thus, the call rings for as long as possible without entering the mailbox. The invention thus enables a person to establish a call easily without cluttering the mailbox for the called number.

19 Claims, 5 Drawing Sheets

Set A                           Set B

1) Set A lifts it's handset

Hook switch released (I)
    Handset on (O)
    Lamp 0 on (O)
    Update Display – Dial Tone (O)

2) Set A dials the DN of Set B (1001)              Figure 2

Key pad 1 pressed (first digit) (I)
    Add 1 to display (O)
    Keypad 1 released (I)
    .
    .

Key pad 1 pressed (last digit) (I)
    Add 1 to display (O)
                           Flash Lamp 0 (O)
                           Ring/Buzz on (O)
    Keypad 1 released (I)

3) Set B lifts it's handset and completes call

Hook switch released (I)
                           Handset on (O)
                           Ring/Buzz off (O)
                           Lamp 0 on (O)
                           Update display – Active (O)
    Update display – Active (O)

4) Set A replaces it's handset (hangs up)

Hook switch released (I)
    Handset off (O)
    Update display – Idle (O)
    Lamp 0 off (O)
                           Update display – Idle (O)
                           Lamp 0 off (O)

5) Set B replaces it's handset

Hook switch released (I)
                           Handset off (O)

DCH 6 UIPE_OMSG CC_SETUP_REQ  REF 00000011 CH 6 5 TOD 10:34:50
PRIM HDR: 01 00 01 00 53 00
MSG HDR: 08 02 11 00 0E 00
BCAP: 01 0D 13 00 01 10 00 00 23 00 00 00 00 00 00
CHID: 09 09 0D 00 29 00 03 00 01 00 05
PROGI: 1E 04 03 00 01 83
CLG#: 05 0A 07 00 62 00 04 00 01 0A 0A 01
CAD#: 03 0A 03 00 62 00 04 00 03 0A 0A 0A
SNCMP: 23 00
SRVIN: 24 04 03 00 01 01
TRCNT: 27 03 01 00 00
PCATG: 1D 03 01 00 01

DCH 7 UIPE_IMSG CC_SETUP_IND  REF 00000011 CH 7 5 TOD 10:34:50
PRIM HDR: 2F 00 01 00 48 00
MSG HDR: 08 02 11 00 2E 00
SNCMP: 23 00
BCAP: 01 07 13 00 81 90 00 00 A3
CHID: 09 09 0D 00 A9 00 83 00 01 00 85
CAD#: 03 0A 03 00 E2 00 04 00 03 0A 0A 0A
PROGI: 1E 04 03 00 81 83
CLG#: 05 0A 07 00 62 80 04 00 01 0A 0A 01
TRCNT: 27 03 01 00 80
PCATG: 1D 03 01 00 81

DCH 7 UIPE_OMSG CC_PROCEED_REQ  REF 00008011 CH 7 5 TOD 10:34:50
PRIM HDR: 01 00 01 00 18 00
MSG HDR: 08 02 91 00 09 00
CHID: 09 09 0D 00 29 00 03 00 01 00 05
UCAP: 2D 04 01 00 00 80
..
....
......

DCH 7 UIPE_OMSG CC_ALERT_REQ  REF 00008011 CH 7 5 TOD  10:34:50
PRIM HDR: 01 00 01 00 12 00
MSG HDR:  08 02 91 00 01 00
PCATG: 1D 03 01 00 01
PROGI: 1E 04 03 00 01 82

DCH 6 UIPE_IMSG CC_PROCEED_IND  REF 00000011 CH 6 5 TOD  10:34:50
PRIM HDR: 2F 00 01 00 12 00
MSG HDR:  08 02 11 00 29 00
CHID: 09 09 0D 00 A9 00 83 00 01 00 85

DCH 6 UIPE_IMSG CC_ALERT_IND  REF 00000011 CH 6 5 TOD  10:34:50
PRIM HDR: 2F 00 01 00 0C 00
MSG HDR:  08 02 11 00 21 00
PCATG: 1D 03 01 00 81

DCH 7 UIPE_OMSG CC_SETUP_RESP   REF 00008011 CH 7 5 TOD  10:34:52
PRIM HDR: 01 00 01 00 1D 00
MSG HDR:  08 02 91 00 0F 00
PROGI: 1E 04 03 00 01 82
CONN#: 0C 0A 07 00 62 00 04 00 03 0A 0A 0A
PCATG: 1D 03 01 00 01

DCH 6 UIPE_IMSG CC_SETUP_CONF  REF 00000011 CH 6 5 TOD  10:34:52
PRIM HDR: 2F 00 01 00 1E 00
MSG HDR:  08 02 11 00 30 00
PROGI: 1E 04 03 00 81 82
CONN#: 0C 0A 07 00 62 80 04 00 03 0A 0A 0A
PCATG: 1D 03 01 00 81
...
......
........

Figure 3(b)

METHOD FOR CONTROLLING A TELEPHONE CALL BETWEEN TWO ITEMS OF TERMINATING EQUIPMENT

FIELD OF THE INVENTION

The present invention relates to a telephony exchange, a computer program product and a method for controlling a telephone call between two items of terminating equipment.

BACKGROUND OF THE INVENTION

Telephony exchanges increasingly include more and more functionality enabling users of terminating equipment connected to such exchanges to more easily connect and communicate with other users. For example, to prevent users having to repeatedly enter a number, which they need to repeatedly dial, many phones include a programmable re-dial function key. After making a call, a user can press this key to cause the exchange to re-dial the number. (In the case of phone sets connected to public switched telephone network (PSTN) exchanges, this functionality may in fact be built into the phone set which stores the last dialed number.)

Another feature is "Call Back Request" or "Ring Again". Again this feature is generally associated with a programmable function key on a phone set connected to a PBX (Private Branch Exchange), which the user presses after connecting to a phone which is engaged. The exchange detects when the called user releases the engaged phone, and then establishes a call between the called user and the user who sought a call back request, by calling both users and then connecting them when they answer their respective phones.

Voice mail is also becoming ubiquitous, enabling callers to leave messages either: when a called user's line(s) is engaged; when the called user is not logged onto a phone; or when the called user is away from their desk or not answering the phone. In the first two cases, a caller is usually diverted to the called person's mailbox immediately whereas in the latter case, the called person's phone rings a number of times, before the caller is eventually diverted to the called person's mailbox.

Voice mail is usually indicated by a light flashing on a user's phone and is picked up by pressing a programmable function key on the phone. On pressing the key, the user may be required to input a password after which they are usually able to browse interactively through any messages in their mailbox by selecting options from a keypad or even through voice interaction.

If a caller feels a call is important, then it may not be satisfactory to leave a message when the called person's phone for whatever reason rings out and diverts the caller to the mailbox. Presently, the caller can then only continually re-try the number (perhaps using the re-dial button) until the called person answers. This may, however, result in the caller being diverted to the called person's mailbox a number of times and so unnecessarily clogging the mailbox. It also means that the caller is occupied with re-dialing the number until the call is answered.

DISCLOSURE OF THE INVENTION

In a first aspect, the present invention provides a telephony exchange for establishing a telephone call between a calling item and a called item of terminating equipment, said called item of terminating equipment being associated with a mailbox to which calls to said called item of terminating equipment meeting a criterion are diverted, said exchange comprising: a first detector, responsive to a signal from a calling item of terminating equipment, for determining that a party employing said calling item wishes to employ automatic dialling of a called item; a second detector arranged to determine said criterion which, if met, causes a call to said called item to be diverted to a mailbox; and an automatic dialling component, responsive to said first detector determining that said party employing said calling item wishes to employ automatic dialling, arranged to attempt to establish a call to said called item in a manner which prevents said criterion from being met.

In a second aspect there is provided a method for controlling a telephone call between a calling item and a called item of terminating equipment, said called item of terminating equipment being associated with a mailbox to which calls to said called item of terminating equipment meeting a criterion are diverted, said method comprising the steps of: receiving a signal from the calling item indicating that a user of the calling item wishes to employ automatic dialling of a called item; determining said criterion which, if met, causes a call to said called item to be diverted to a mailbox; and automatically attempting to establish a call to said called item in a manner which prevents said criterion from being met.

In a third aspect there is provided a computer program product for controlling a telephone call between a calling item and a called item of terminating equipment, said called item of terminating equipment being associated with a mailbox to which calls to said called item of terminating equipment meeting a criterion are diverted, said computer program product being arranged to: receive a signal from the calling item of terminating equipment indicating that a party employing said calling item wishes to employ automatic dialling of a called item; determine said criterion which, if met, causes a call to said called item to be diverted to a mailbox; and automatically attempt to establish a call to said called item in a manner which prevents said criterion from being met.

BRIEF DESCRIPTION OF THE DRAWINGS

Embodiments of the invention will now be described with reference to the accompanying drawings, in which:

FIG. 2 illustrates a messaging sequence involved in establishing a call between two phone sets connected to a single PBX;

FIGS. 3(a) and 3(b) illustrate a messaging sequence involved in establishing a call between two phone sets connected to a respective PBXs communicating via ISDN (integrated Services Digital Network) messages.

DESCRIPTION OF THE PREFERRED EMBODIMENTS

Figure 1:
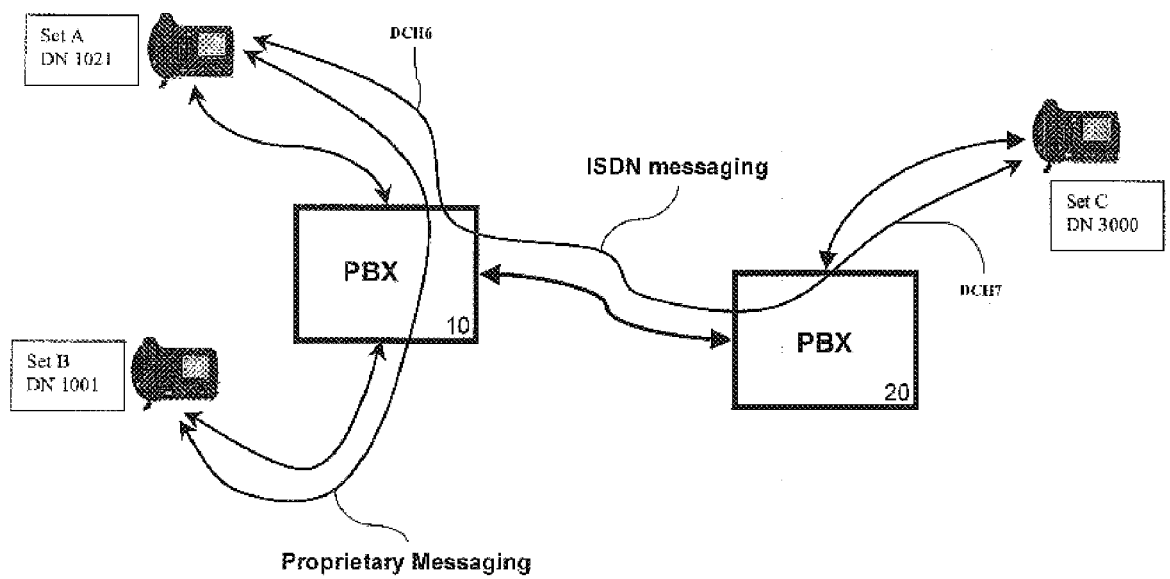
FIG. 1 is a schematic diagram of a telephone system including a PBX according to the invention.

FIG. 1 illustrates an environment where two embodiments of the invention can be implemented. In a first embodiment, telephone calls between phone Set A and Set B connected to the same exchange 10 may employ automatic re-dialling according to the invention. In a second embodiment, telephone calls between phones connected to different exchanges 10, 20 may employ automatic re-dialling according to the invention. The line labelled "proprietary messages", where proprietary messages are sent between, for example, a PBX (Private Branch Exchange) 10 and the Sets A and B, illustrates how such proprietary messages, can be used to signal the sets to provide the appropriate messages/indications as to the status of the call. On the other hand, the line labelled "ISDN messaging" illustrates how messages conveying the status of the call could also be sent via ISDN messages, for example, a setup or facility message could be sent where either the calling or called party requires automatic re-dialing.

Referring to FIG. 2 which shows a sequence for a conventional simple local, handset to handset, call internal to a PBX, for example, a Meridian M1produced by Nortel Networks. SSD (Scan Signal Distribution) are messages between a phone and a line card within the PBX. Each message contains a TN (Terminal Number), a unique identifier associated with each phone, and a command control. In the example,(O) designates messages Outgoing from PBX to set, and (I) designates messages Incoming to PBX from set.

Thus, when at step 1, the handset is lifted on Set A, an SSD message indicating that the hook switch has been released is transmitted to the PBX 10. The PBX then sends a series of messages to Set A, turning the handset on, turning on any lights associated with lifting the handset and updating the display accordingly and possibly setting a dial tone on. (Alternatively, a dial tone may not be turned on, until it is determined that a user requires an outside line.)

At step 2, the user begins to dial the required number—in this case 1001. Each time a key pad button is pressed, a corresponding message is sent to the PBX 10 and the PBX 10 responds by adding the displayed digit to the display of Set A. When the last digit is dialled, the PBX then sends messages to the dialled extension, Set B. In this case, the messages cause a light to flash and the ringer to ring on Set B. The display on Set B may also be updated to indicate the caller number.

At step 3, the user of Set B picks up the handset to answer the call, and the PBX detects that the hook switch is released when it receives an appropriate message from Set B. The PBX then sends a message instructing Set B to turn on the handset, turn off the ringer, turn the flashing light on permanently and to update the display accordingly. A message is also sent to Set A, updating the display.

The phone call continues as normal, until one party or the other either replaces their handset. In the example of FIG. 2, at step 4, Set A replaces the handset. This causes conventional messages to be exchanged turning off the handset for Set A and updating the displays and lights of Set A and Set B. Finally, at step 5, Set B replaces its handset, indicated to the PBX with a message and so its handset is turned off.

If on the other hand, at step 3, the call is not answered at Set B before a pre-determined number of rings, the call is diverted by the PBX to the Set B mailbox. This usually entails the PBX playing a message associated with Set B to Set A, and following a prompt the user of Set A recording a message. The user of Set A then relies on the user of Set B to pick up the message and to respond within an acceptable time.

In the preferred embodiment, the automatic re-dialling feature is programmed on the PBX to a DN key on a phone set. Because the number of keys on a phone set is limited, the automatic re-dialling feature preferably shares a DN key with another feature, for example, re-dial. It is particularly useful to share a DN key with re-dial as, for example, if a user wishes to re-dial a number, they press the DN key once (or for a short time), whereas if they wish to employ automatic re-dialling according to the invention, they may press the DN key twice (or for a longer time). In both cases, the last dialled number is associated with the DN key and so this makes control of the respective features both easier and compatible and also provides an intuitive user interface.

In any case, internally in the PBX software, a flag is set to state that the last called number, if diverted to a mailbox, and preferably all subsequent calls from this set are to employ automatic re-dialling until the DN key is pressed again, either twice or for longer than a pre-determined time, to turn off automatic re-dialling.

In the example above, where the user selects automatic re-dialling after being diverted to a called person's mailbox, the PBX first determines the number of rings that the called persons's phone was allowed to ring before being diverted to the mailbox—ringing time. This may be a PBX wide setting or a user, through interaction with their phone, may be able to customise their settings. Alternatively, rather than looking up the ringing time value, the value can be associated (or "key linked") with the DN key on the calling person's phone every time the PBX diverts a call to a called person's mailbox.

Thus, if a number and ringing time value are key linked to a DN key, the PBX will know if a user activates automatic re-dialling that the stored number should be automatically re-dialled. On the other hand if only a number is stored, the PBX will know that the previous call was not diverted to a mailbox and so if the user activates automatic re-dialling, the PBX will know that automatic re-dialling should only apply to subsequently dialled numbers or that only a simple re-dial is required.

Nonetheless, where automatic re-dialling is required, the PBX at a frequency which may either be PBX wide or set by the calling person, begins calling the previously called person's phone, but only allowing the phone to ring for less than the time causing the call to divert to the called person's mailbox. So, this may, for example, be one ring less than causes the call to divert. The frequency may be set so that in fact it can appear at the called person's phone that the phone is ringing continuously.

When re-dialling the called person's phone, the PBX can be set to establish the call at the calling person's phone. As such the PBX, is simulating the calling person repeatedly calling the called person. This makes the caller aware of the ringing pattern at the called person's phones and may prove beneficial as it prevents the caller forgetting about the automatic re-dialling feature and having a called person's phone ringing for an unacceptable period.

Nonetheless, the invention also covers only ringing the called person's phone and, only when the called person answers the phone, ringing the caller's phone to establish the call.

In this case, it will be seen that the calling person's line(s) remain free. It is therefore possible for the calling person to initiate another call while automatic re-dialling of a previously called party is occurring. In this case, the PBX may either cease automatic re-dialling as soon as the caller attempts to place another call, as this may prevent the caller from receiving the original call whenever it is answered, or if the caller has more than one line and at least one line remains free, the PBX may continue dialling. In any case, any such scheme falls within the scope of the invention.

Turning now to the operation of calls placed after the setting of the automatic re-dial feature. It will be seen that the PBX can be set to proactively respond to the user having activated the automatic re-dialling feature. Thus, the PBX could be set to avoid diverting a call to a called person's mailbox even once. Thus, if automatic re-dialling is set, the PBX will cause the initial call to be dropped, say one ring, before the call is diverted to the called person's mailbox. A message may then be displayed on the calling person's phone display indicating that automatic re-dialling has been initiated as described above and the calling person can then release the phone until the called person answer's.

It should be seen that the nature of the indication required to perform the invention is determined by the type of terminating equipment. Where the equipment comprises a phone with a display, this can display a message, if not, a designated lamp can flash, or a lamp can flash with a pre-determined pattern. Alternatively, a message can be played to the user.

It will be seen from the above variation that the automatic re-dialling feature can in fact be employed more broadly to the extent that if the feature is activated, it indicates to the exchange that the caller wishes to completely avoid the called person's mailbox. If the invention is implemented in this manner, the PBX on detecting that a calling phone set has the automatic dialling feature activated will cause the called person's phone to ring potentially indefinitely without diverting to the called person's mailbox. It may also provide an indication on the called person's phone that the automatic dialling is taking place and that the call will not be diverted to the mailbox.

On the other hand, the PBX may divert the call to the called person's mailbox once, and thereafter begin automatic re-dialling, as if the calling person had selected the feature immediately after having being diverted to the called person's mailbox.

In any, case automatic re-dialling may cease either after a pre-determined time out period specified by the user or within the PBX 10 or else when the user presses the programmable function key to indicate that they wish automatic re-dialling switched off.

Turning now to the second embodiment of the invention. The embodiment takes into account that a PBX 10 compliant with the invention may be communicating with either a compliant or a non-compliant PBX 20. In the former case, a compliant PBX 20 can be used to signal the PBX 10 to indicate either that it will attempt to establish a call from the called person's phone, whenever it is answered, to the calling person's phone; or it can indicate that it does not wish incur the toll charges for establishing the call signal and so only provide to the calling PBX the number of rings it allows before diverting a call to a called person's mailbox. In either case, where the PBX 10 undertakes to keep calling the PBX 20 to try to establish the call, bandwidth is used in repeatedly attempting to establish the call.

This embodiment will now be explained in more detail in relation to FIGS. 3(*a*) and (*b*), which illustrate an ISDN D-channel messaging sequence for a conventional phone call where phone Set A with number 1021 calls phone Set C with number 3000. As is known in ISDN messaging, a D-channel carries control signalling for a plurality of associated calls, each call comprising a bearer channel. In the example, DCH 6 is the D-Channel for Set A, while DCH 7 is the D-Channel for Set C.

In the example, a CC_SETUP_REQ message is first sent from PBX 10 to PBX 20. PBX 20 receives this as a CC_SETUP_IND message. PROCEED and ALERT messages are then exchanged. It is when PBX 10 receives a CC_ALERT_IND message from PBX 20, FIG. 3(*b*), that it knows the phone Set C is ringing. When the call is either answered by the person at Set C or the call is diverted to a mailbox for Set C, the PBX 20 will send a CC_SETUP_RESP message to PBX 10 which is received at the PBX 10 as a CC_SETUP_CONF message. If the PBX 20 is not compliant with the invention, then the PBX 10 will have no idea as to whether the call has been taken by the person at Set C or diverted to their mailbox—only that the call was answered after ringing from the approximately the time taken between receipt of the CC_ALERT_IND and the CC_SETUP_CONF messages. This time will again be referred to as the ringing time.

Thus, in a first variation of the second embodiment, where the PBX 20 is assumed not to be compliant with the invention, if the user of Set A on discovering that they have been put through to a voice mailbox, wishes to employ automatic re-dialling, the user disconnects the phone Set A (possibly after leaving a message) by pressing the programmable function key associated with automatic re-dialling.

The PBX controlling software then associates or "key links" with this function key: the previously dialled number (in a manner analogous to the operation of a conventional re-dial button); and the ringing time. Pressing the automatic re-dialling function key may also cause the PBX 10 to display a prompt on the display for Set A, asking the user to specify a re-dialling frequency and possibly a time-out period. Alternatively, these values can be set for all users by the PBX.

In any case, the PBX 10 at the frequency specified begins the process of establishing a call with PBX 20. This call proceeds as in the case of FIGS. 3(*a*) and 3(*b*). However, a timer or counter begins as soon as the CC_ALERT_IND message is received. At a time less than the previously recorded ringing time, if the user of Set C has not answered the phone, the PBX 10 begins the process of disconnecting the call which includes a sequence of messages including: a disconnect request and disconnect indicator, a release request and release indicator, a release response and a release confirm message.

Once the call is disconnected, the PBX 10 waits for a time determined by the specified frequency before again trying to establish the call.

Again as in the first embodiment, the user can cause automatic re-dialling to stop by pressing the programmable function key or the PBX 10 can be set to stop re-dialling after a specified time out period. In either case, the key linked data remains stored with the programmable function key until it is over-ridden by another number, so allowing the user to re-instigate automatic re-dialling of a stored number simply by pressing the programmable function key.

In a second variation of the second embodiment, the PBX 10 is in communication with a compliant PBX 20. Implementation of this variation of the invention does not require any changes to the basic messaging sequence, but in the preferred embodiment, a new information element (IE) is added to the ISDN setup request message, FIG. 4. This indicates to the called party's PBX if the automatic re-dialling feature has been activated by a caller prior to a call being made; or that he PBX may employ automatic re-dialling, if the caller only activates automatic re-dialling after the first call to a number has been diverted to a mailbox. The new information element could be added to any message of the sequence of messages required to setup a call, but it will be seen that the setup request message is the first and most often present of the sequence and gives a PBX the maximum opportunity to determine its course of action.

The following is a basic breakdown of an example information element, AUTO_DIAL:

AUTO_DIAL: 98 01 HH

---
93 Information element identifier
01 Length of Information element
HH Auto Dial Set State

--- where HH=00 for no automatic re-dialling and HH=01 for automatic re-dialling.

Thus, included in the SETUP message below for a call between Set A and Set C is the new Information Element (IE), 98 named AUTO_DIAL:

DCH6UIPE_OMSG CC SETUP_REQ REF 00000011 CH 6 5 TOD 10:34:50
PRIM HDR: 01 00 01 00 53 00
MSG HDR: 08 02 11 00 0E 00
BCAP: 01 0D 13 00 01 10 00 00 23 00 00 00 00 00 00
CHID: 09 09 0D 00 29 00 03 00 01 00 05
PROGI: 1 E 04 03 00 01 83
CLG#: 05 0A 07 00 62 00 04 00 01 0A 02 01
CAD#: 03 0A 03 00 62 00 04 00 03 0A 0A 0A
SNCMP: 23 00
SRVIN: 24 04 03 00 01 01
TRCNT: 27 03 01 00 00
PCATG: ID 03 01 00 01
AUTO_DIAL: 98 01 01

If an AUTO_DIAL value of "98 01 00" is used in a setup request, it indicates to a receiving PBX 20, that the calling set has not yet activated automatic re-dialling. If an AUTO_DIAL value of "98 01 01" is used in a request, it indicates to the receiving PBX 20, that the calling set has activated automatic re-dialling.

In the present example, in response to a setup request message from PBX 10, PBX 20 eventually issues a setup response message. If the PBX 20 is compliant with the invention, it will include an AUTO_DIAL IE in the setup response. If not, no AUTO_DIAL IE is included, the PBX 20 is assumed to be non-compliant and the PBX 10 can proceed as in the first example. (It will also been seen that the invention will not adversely affect calls made from a non-compliant PBX to a compliant PBX as the compliant PBX will not supply an AUTO_DIAL IE in response to a setup request message which doesn't contain such an IE.)

Thus, included in the SETUP confirm message below for a call between Set A and Set C connected to a compliant PBX 20 is an AUTO_DIAL IE:

DCH 6 UIPE_IMSG CC_SETUP_CONF REF 00000011 CH6 5 TOD 10:34:52
PRIM HDR: 2F 0001 010 1E 00
MSG RDR: 08 02 1100 30 00
PROGI: IE 04 03 00 81 82
CONN#: 0C 0A 07 00 62 80 04 00 03 0A 0A 0A
PCATG: ID 03 01 00 81
AUTO_DIAL: 98 01 00

If an AUTO_DIAL value of "98 01 00" is used in response to a setup request message having an AUTO_DIAL IE of value of "98 01 01", it indicates to the PBX 10, that the PBX 20 is both compliant and willing to undertake automatic re-dialling if the called person does not answer the phone.

Thus, the PBX 10 knows that either the PBX 20 will keep phone Set C ringing until it is answered; or if PBX 20 initially diverts the caller to the called person's mailbox, the PBX 20 will subsequently call the Set C at a frequency, for a time and with a time-out set within PBX 20. If Set C is eventually answered, the PBX 20 attempts to establish a call back to PBX 10 and to Set A. While this is happening a message can be played on Set C. If, on the other hand automatic re-dialling times out, PBX 20 can attempt to establish a call to PBX 10 and to Set A and play a message indicating such to Set A.

On the other hand, if an AUTO_DIAL value of "98 01 nn", where nn is greater than 1, is used in response to a setup request message having any AUTO_DIAL IE value, it indicates to the PBX 10, that the PBX 20 although compliant is not willing to undertake automatic re-dialling. (Presumably, because it does not wish to incur the toll charges for establishing a call back to PBX 10 and doesn't mind PBX 10 occupying bandwidth as it repeatedly tries to establish a call with Set C.)

Thus, regardless of whether or not the caller has activated automatic re-dialling prior to making a call, the PBX 20 provides the PBX 10 with the number of rings (or a counter value indicating the ringing time) before a call will be transferred to the called person's mailbox. This value is again key linked to the DN key allocated to the automatic re-dialling function.

The PBX 10 thus knows that if Set A has requested automatic re-dialling, then the PBX 10 must automatically undertake to establish the call by repeatedly calling the PBX 20 and allowing Set C to ring for no more than the stored ringing time until either Set C answers; the time out period is exceeded or the user of Set A switches of automatic re-dialling.

If on the other hand automatic re-dialling is only activated on Set A after the initial attempted call to Set C, then if the PBX 20 had been compliant, the PBX 10 will have stored the automatic re-dialling parameters including the phone number and ringing time with the programmable function key, and so will immediately be able to proceed with automatic re-dialling of Set C.

Figure 4:
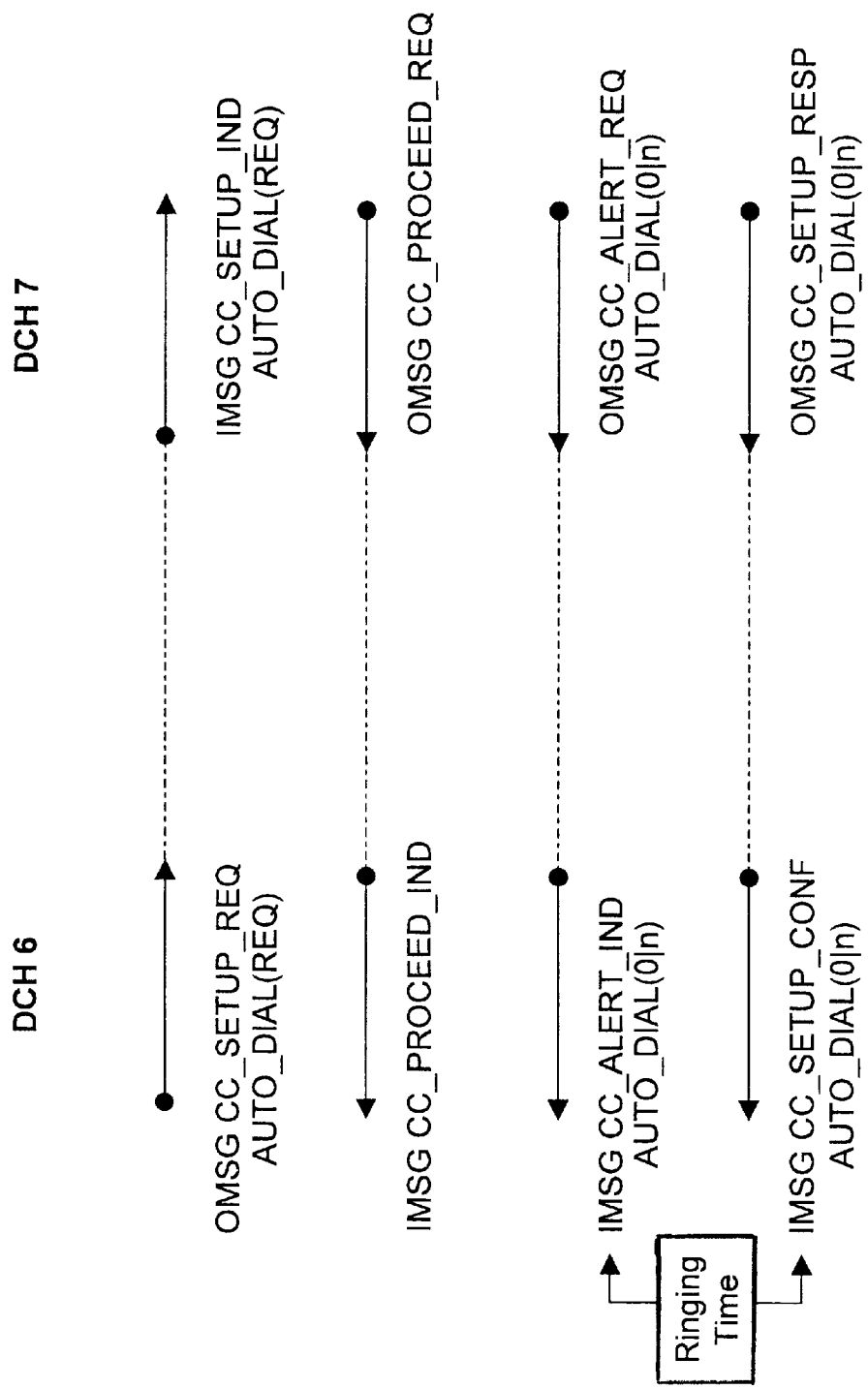
FIG. 4 graphically illustrates a messaging sequence according to a second embodiment of the invention.

It will be seen that many variations of the messaging sequence described are possible. For example, as shown in FIG. 4, it is equally possible for the PBX 20 to return the AUTO_DIAL IE within the ALERT request message, as at this stage it knows the length of time before which Set A will be diverted to a mailbox and it also knows whether or not it will undertake re-dialling.

In any case, the compliant PBX 20 enables the user of Set A having been diverted to a called person's mailbox to begin automatic re-dialling on the next call.

It will also be seen that in some cases a called PBX could in fact issue a message indicating that a call has been diverted to a mailbox rather than being answered at the called phone set. Such an indication could be used at the calling PBX to determine how to process a user's activation of the automatic re-dialling feature.

On the other hand, if a caller connects to a non-compliant PBX which does provide such a message and then disconnects from the call, the caller must then re-dial the number (possibly using a programmable re-dial button) and then disconnect using the programmable automatic re-dialling button, to allow automatic re-dialling to take place. This means that such a caller may end up having to leave two voice messages rather than one.

Having described the embodiments above, it will be seen that the principles of the invention can be applied to any telephony exchange, be it web client software such as NetMeeting from Microsoft for VoIP calls where messages are transmitted across the Internet, or even mobile phone calls where messages are transmitted across the GSM network. It will also be seen that the invention can be implemented with PSTN exchanges. Furthermore, it will be seen that the invention is not necessarily limited to voice calls and could be adapted to be implemented within video calls.

Finally, it will be seen that while the embodiments have been described in terms of a user pressing a function key to indicate that they require automatic re-dialling, it will be seen that this indication can be made by any suitable means, for example, by entering special prefix codes or even using hook flash commands on an analog phone.

What is claimed is:

1. A telephony exchange for establishing a telephone call been a calling item and a called item of terminating equipment, said called item of terminating equipment being associated with a mailbox to which calls to said called item of terminating equipment are diverted after ringing for a predetermined time, said exchange comprising:

a first detector, responsive to a sign from a calling item of terminating equipment, for determining that a party employing said calling item wishes to employ automatic dialling of a called item;

a second detector arranged to determine a value indicative of said predetermined time which, if met, causes a call to said called item to be diverted to a mailbox; and an automatic dialling component, responsive to said first detector determining that said party employing said calling item wishes to employ automatic dialling, and responsive to said value being communicated by said second detector, arranged to attempt to establish a call to said called item where said called item rings for a time less than that indicated by said value.

2. A telephony exchange as claimed in claim 1 wherein said automatic dialling component is arranged repeatedly attempt to establish a call at a pre-determined frequency.

3. A telephony exchange as claimed in claim 1 wherein said called item is an item called immediately previously by said calling item.

4. A telephony exchange as claimed in claim 1 wherein at least one item of said terminating equipment is a phone set.

5. A telephony exchange as claimed in claim 1 said first detector is responsive to a programmable function key being activated in a fist manner to cause said telephony exchange to re-dial an immediately previously dialled number, and said first detector is responsive to said programmable function key being activated in a second manner to cause said automatic dialling component to attempt to establish a call to said called item.

6. A telephony exchange as claimed in claim 1 comprising:

an indicator arranged to update a graphical display on said item of terminating equipment to indicate that said party employing said phone set wishes to employ automatic dialing of a called item.

7. A telephony exchange as claimed in claim 1 comprising an indicator arranged to update a textual display on said item of terminating equipment to indicate that said party employing said phone set wishes to employ automatic dialling of a called item.

8. A telephony exchange as claimed in claim 1 comprising an indicator arranged to provide a physical indication on said item of terminating equipment to indicate that said party employing said phone set wishes to employ automatic dialling of a called item.

9. A telephony exchange as claimed in claim 1 wherein at least one item of said terminating equipment comprises a multimedia terminal.

10. A telephony exchange as claimed in claim 1 wherein said exchange is a private branch exchange (PBX) and said two items of terminating equipment are connected to said exchange.

11. A telephony exchange as claimed in claim 1 wherein said exchange is a PBX, said PBX is adapted to communicate with one or more other private branch exchanges using ISDN messaging and one item of said two items of terminating equipment is connected to one of said other private branch exchanges.

12. A telephony exchange as claimed in claim 11 wherein said second detector is arranged to determine from ISDN messages returned from said one other private branch exchange a value indicative of the time for which said called item of terminating equipment rings before a call is diverted to a mailbox for said called item; and wherein said automatic dialling component is arranged to attempt to establish a call to said called item where said called item rings for a time less than that indicated by said value.

13. A method for controlling a telephone call between a calling item and a called item of terminating equipment, said called item of terminating equipment being associated with a mailbox to which calls to said called item of terminating equipment are diverted after ringing for a predetermined time, said method comprising the steps of:

receiving a signal from the calling item indicating that a user of the calling item wishes to employ automatic dialling of a called item;

determining a value indicative of said predetermined time which, if met, causes a call to said called item to be diverted to a mailbox; and automatically attempting to establish a call to said called item where said called item rings for a time less than that indicated by said value.

14. A computer product for controlling a telephone call between a calling item and a called item of terminating equipment, said called item of terminating equipment being associated with a mailbox to which calls to said called item of terminating equipment are diverted after ringing for a predetermined time, said computer program product being arranged to:

receive a signal from the calling item of terminating equipment indicating that a party employing said calling item wishes to employ automatic dialling of a called item;

determine a value indicative of said predetermined time which, if met, causes a call to said called item to be diverted to a mailbox; and automatically attempt to establish a call to said item where said called item ring for a time less than that indicated by said value.

15. A communications network comprising a telephony exchange as claimed in claim 1.

16. An item of terminating equipment comprising computer program product as claimed in claim 14.

17. An item of terminating equipment as claimed in claim 16 wherein said item is the calling item.

18. A telephony exchange comprising a computer program product as claimed in claim 14.

19. A telephony exchange as claimed in claim 1 wherein said value indicative of said predetermined time is determined according to the number of rings detected before the call is diverted to a mailbox.

* * * * *